(12) United States Patent
Spies et al.

(10) Patent No.: US 11,423,504 B2
(45) Date of Patent: Aug. 23, 2022

(54) SYSTEM FOR PROTECTING SENSITIVE DATA WITH DISTRIBUTED TOKENIZATION

(71) Applicant: ENTIT SOFTWARE LLC, Sanford, NC (US)

(72) Inventors: Terence Spies, Mountain View, CA (US); Richard T. Minner, Carmichael, CA (US)

(73) Assignee: Micro Focus LLC, Santa Clara, CA (US)

( * ) Notice: Subject to any disclaimer, the term of this patent is extended or adjusted under 35 U.S.C. 154(b) by 2339 days.

(21) Appl. No.: 14/060,186

(22) Filed: Oct. 22, 2013

(65) Prior Publication Data

US 2014/0046853 A1   Feb. 13, 2014

Related U.S. Application Data

(62) Division of application No. 13/364,288, filed on Feb. 1, 2012, now Pat. No. 8,595,850.

(60) Provisional application No. 61/592,536, filed on Jan. 30, 2012.

(51) Int. Cl.
*H04L 9/06* (2006.01)
*G06Q 99/00* (2006.01)
*H04L 9/08* (2006.01)

(52) U.S. Cl.
CPC ........... *G06Q 99/00* (2013.01); *H04L 9/0625* (2013.01); *H04L 9/0897* (2013.01)

(58) Field of Classification Search
CPC . H04L 29/06; H04L 9/00; G06F 12/14; G06F 7/00; G06F 15/173; G06F 17/30
See application file for complete search history.

(56) References Cited

U.S. PATENT DOCUMENTS

| | | | | |
|---|---|---|---|---|
| 7,813,822 | B1* | 10/2010 | Hoffberg | H04N 21/44222 700/94 |
| 8,412,837 | B1* | 4/2013 | Emigh | G06F 21/6209 709/229 |
| 9,600,421 | B2* | 3/2017 | Miller | G06F 21/78 |
| 2009/0249082 | A1* | 10/2009 | Mattsson | G06F 21/6218 713/193 |

(Continued)

*Primary Examiner* — Patrick McAtee
*Assistant Examiner* — Nakia Leffall-Allen

(57) ABSTRACT

A token generating organization may include distributed tokenization systems for generating tokens corresponding to sensitive information. Sensitive information may include sensitive numbers such as social security numbers, credit card numbers or other private numbers. A tokenization system may include multiple physically distinct hardware platforms each having a tokenization server and a database. A tokenization server may run portions of a sensitive number through a predetermined number of rounds of a Feistel network. Each round of the Feistel network may include tokenizing portions of the sensitive number using a fractional token table stored an associated database and modifying the tokenized portions by reversibly adding portions of the sensitive number to the tokenized portions. The fractional token table may include partial sensitive numbers and corresponding partial tokens. A sensitive-information-recovery request including the token may be directed to the token generating organization from the token requestor to recover sensitive information.

18 Claims, 10 Drawing Sheets

(56) References Cited

U.S. PATENT DOCUMENTS

| | | |
|---|---|---|
| 2009/0310778 A1 | 12/2009 | Mueller |
| 2010/0011410 A1* | 1/2010 | Liu ................. H04L 63/20 726/1 |
| 2010/0145860 A1* | 6/2010 | Pelegero ............. G06Q 20/12 705/71 |
| 2011/0154466 A1* | 6/2011 | Harper ............... G06Q 20/34 726/9 |
| 2011/0154467 A1* | 6/2011 | Bomar ............... G06Q 20/385 726/9 |
| 2011/0161233 A1* | 6/2011 | Tieken ............. G06Q 20/4014 705/71 |
| 2011/0213807 A1* | 9/2011 | Mattsson ........... G06F 21/6245 707/802 |
| 2011/0307710 A1* | 12/2011 | McGuire ............. H04L 29/06 713/183 |
| 2012/0265631 A1* | 10/2012 | Cronic ............. G06Q 20/3674 705/26.1 |
| 2012/0272326 A1* | 10/2012 | Kai ................. G06Q 20/363 726/26 |
| 2012/0304273 A1 | 11/2012 | Bailey et al. |
| 2012/0317036 A1* | 12/2012 | Bower ............... G06Q 20/02 705/75 |
| 2013/0047224 A1 | 2/2013 | Radhakrishnan |
| 2013/0047228 A1* | 2/2013 | Radhakrishnan ..... H04L 9/3213 726/7 |
| 2013/0047241 A1 | 2/2013 | Radhakrishnan et al. |

\* cited by examiner

40

FRACTIONAL TOKEN TABLE

| HALF-TOKEN | HALF-SENSITIVE-NUMBER |
|---|---|
| 5390 0000 | 1234 1111 |
| 4311 1234 | 1234 2222 |
| ⋮ | ⋮ |

42 points to the HALF-TOKEN entries; 44 points to the HALF-SENSITIVE-NUMBER entries.

SYSTEM FOR PROTECTING SENSITIVE DATA WITH DISTRIBUTED TOKENIZATION

This patent application claims the benefit of provisional patent application No. 61/592,536, filed Jan. 30, 2012 and patent application Ser. No. 13/364,288 filed Feb. 1, 2012, all of which are hereby incorporated by reference herein in their entireties.

BACKGROUND

This invention relates to online transactions, and more particularly, to ways to help secure sensitive data during online transactions.

Online transactions such as purchase transactions often require that entities such as merchants and payment card processors exchange sensitive information. For example, in connection with a typical purchase by a customer, a merchant often obtains the primary account number (PAN) corresponding to the payment card account of a customer (e.g., the customer's credit card number). The merchant then provides the PAN to a payment card processor (payment processor) as part of an authorization request. The payment processor then uses a tokenization server to obtain a corresponding token from a central database that is provided to the merchant if the purchase is authorized.

Later, when settling the purchase transaction, the merchant may submit the token and the settlement amount to the payment processor. The payment processor may recover the PAN of the customer from the token using the central database.

In this type of transaction, regional tokenization servers typically process purchase transactions with merchants in a given geographical region. Regional tokenization servers typically request the token corresponding to the provided PAN from a common central database. If no token corresponding token exists in the common central database at the time of the request, a new token is generated and an entry is added to the common central database.

Purchase transactions originating with merchants around the world are therefore dependent on global communications systems to provide access to the common database. This can be problematic if any portion of a global communications system becomes temporarily unavailable or inoperable.

In some situations, regional tokenization servers can generate partially tokenized sensitive data at a tokenization server based on one or more previously provided token look-up tables without relying on constant connection to a global communications network. However, these systems typically tokenize only a portion of the sensitive data due to data storage and processing considerations.

It would therefore be desirable to be able to provide improved ways in which to handle sensitive data such as tokens in connection with online transactions.

SUMMARY

Online transactions may involve exchanges of sensitive information between entities and organizations. It may be desirable for an entity such as a merchant or a government agency to protect the sensitive information from exposure (e.g., by maintaining access to the sensitive information without storing the sensitive information).

An entity may protect sensitive information such as a sensitive number without storing the sensitive information by storing a token that corresponds to the sensitive information. The token corresponding to the sensitive information may be acquired by sending a token request that includes the sensitive information from the entity to a token generating organization.

A token generating organization may include geographically diverse tokenization equipment. Blocks of tokenization equipment may be located in multiple cities or other geographic locations. Each city (or other geographic location) may be associated with separate tokenization equipment.

A token may be generated by a tokenization server on one of multiple tokenization systems associated with tokenization equipment in a particular geographic location. Each tokenization system may be implemented on a physically distinct hardware platform. Each hardware platform may include physically separate computing equipment such as a physically a separate power supply, one or more processors, storage and/or other computing equipment.

Each tokenization system may include a tokenization server and an associated database. A tokenization server may generate the token corresponding to the sensitive information using a fractional token table stored on the associated local database. Each local database at each tokenization system associated with the token generating organization may be provided with the fractional token table.

The fractional token table may be pre-populated with partial tokens and corresponding partial sensitive numbers. The tokenization table may be used to map portions of the sensitive information such as portions of the sensitive number to partial (fractional) tokens.

A tokenization server may generate a full token corresponding to sensitive information such as a full sensitive number based on the fractional token table. For example, the tokenization server may perform a predetermined number of rounds of a Feistel network to generate a full token corresponding to a full sensitive number using partial tokens and a partial sensitive numbers stored in the fractional token table. A fractional token table may, for example, be a half-token table (i.e., a table having half-tokens and uniquely corresponding half-sensitive-numbers).

Once the token has been generated by the tokenization server, the token may be provided to the token requesting entity (token requestor). The token may be temporarily stored at the token requestor. The sensitive information may later be recovered by sending a request from the token requestor to the token generating organization for the sensitive information. The request may include the token and additional information such as a monetary settlement amount associated with a purchase transaction.

A tokenization server at one of the tokenization systems associated with the token generating organization may recover the full sensitive number from the full token using the fractional token table in the local database at that tokenization system. For example, the tokenization server may perform the same predetermined number of rounds of the Feistel network in reverse to recover the full sensitive number from the full token using the partial tokens and the partial sensitive numbers stored in the fractional token table.

Sensitive information may include a sensitive number such as a social security number, driver license number, primary account number associated with a credit card, or other sensitive information. Token requesting entities involved in protecting sensitive data for online transactions such as purchase transactions may be merchants (e.g., hotels, online merchants, grocery stores, etc.), universities, government agencies or other entities that use or process sensitive information. Token generating organizations may include banks, credit card companies, government agencies, corporations, payment card processors or other organizations having tokenization systems provided with fractional token tables.

Further features of the invention, its nature and various advantages will be more apparent from the accompanying drawings and the following detailed description of the preferred embodiments.

BRIEF DESCRIPTION OF THE DRAWINGS

FIG. 3 is a diagram of an illustrative fractional token table in accordance with an embodiment of the present invention.

FIG. 6 is a diagram showing how values may be combined using digit-wise addition in accordance with an embodiment of the present invention.

FIG. 7 is a diagram showing how values may be combined using length-preserving arithmetic addition in accordance with an embodiment of the present invention.

DETAILED DESCRIPTION

A token generating organization may generate tokens corresponding to sensitive information in order to protect the sensitive information for online transactions.

Entities that process online transactions may obtain sensitive information associated with an online transaction. It may be desirable for an entity to retain access to the sensitive information for a period of time without risking exposure of the sensitive information.

Entities may obtain sensitive information that includes a sensitive number (SN) from a person, a customer, an organization, etc. A sensitive number may be a social security number (SSN), a credit card number (CCN), a license number, or other private number associated with a person or organization. Entities may desire to maintain access to, for example, a primary account number (PAN) associated with a payment card without risking exposure of the PAN by storing the PAN.

Figure 1:
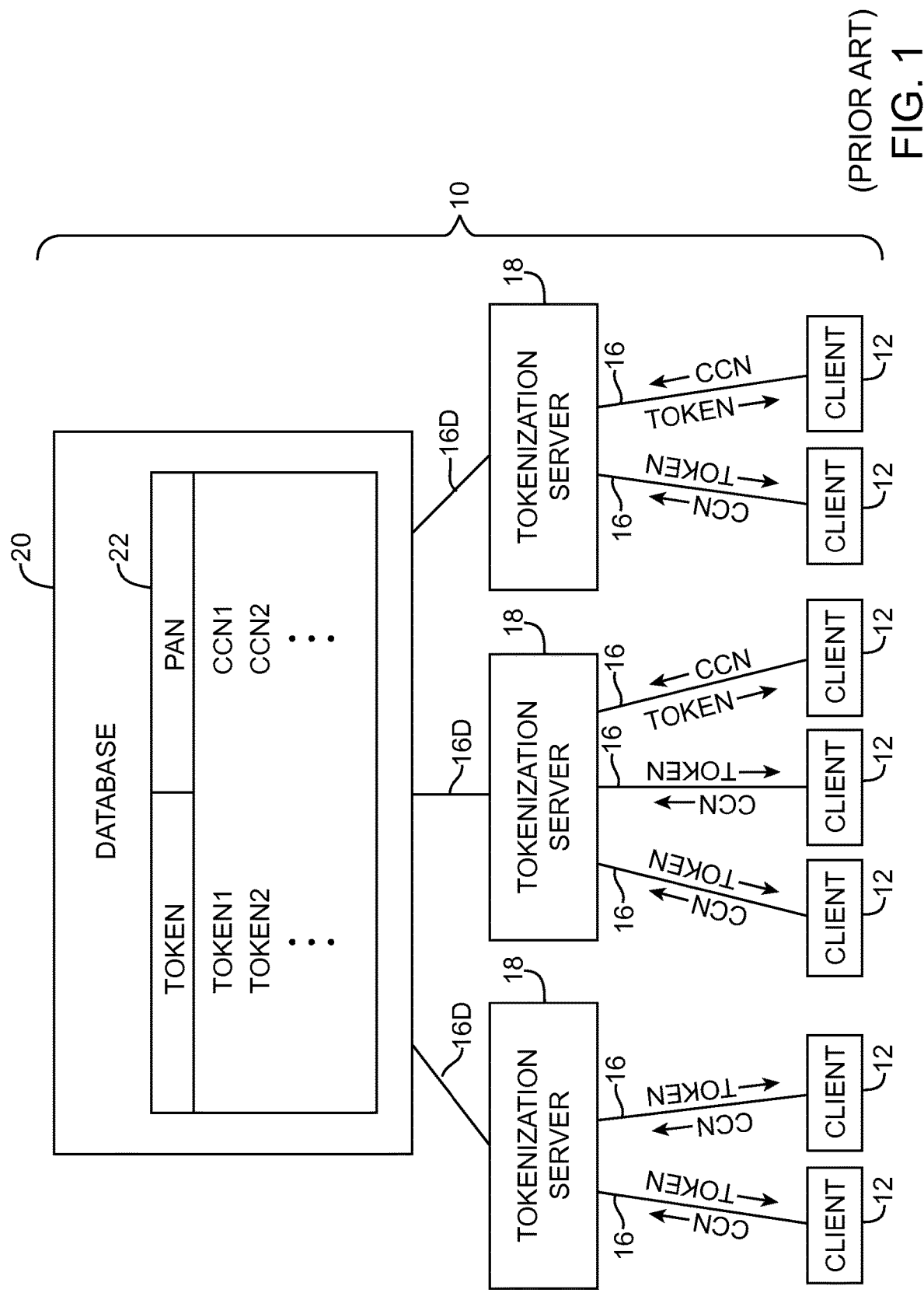
FIG. 1 is a diagram of a conventional online purchase transaction system showing how tokenization servers access a common central database.

Entities may, for example, be merchants that authorize and settle payment card purchase transactions by communicating electronically with organizations such as payment card processors. A conventional system 10 in which payment card transactions are often authorized and settled is shown in FIG. 1. As shown in FIG. 1, clients 12 typically communicate with tokenization servers 18 associated with a bank or credit card company over communications network 16.

Clients 12 commonly submit an authorization request including a customer's credit card number (CCN) to a tokenization server 18 over network 16 to determine whether the customer is authorized to make a purchase. In response to receiving an authorization request, a tokenization server 18 typically returns a token (TOKEN) over network 16 to the client that corresponds uniquely to the customer's PAN.

Tokenization servers 18 are commonly connected over a portion of communications network 16 (i.e., portion 16D of network 16) to a common central database 20. Common database 20 maintains a list 22 of primary account numbers (PANs) and corresponding tokens. Each entry in common database 20 includes a PAN (i.e., CCN1, CCN2, etc.) and a unique token for that PAN (i.e., TOKEN1, TOKEN2, etc.). When presented with a PAN, tokenization server 18 consults database 20 to determine whether an entry for that PAN already exists. If an entry is present, the tokenization server may retrieve the token associated with the PAN. If no entry is currently present for the PAN, tokenization server 18 generates a token for the PAN and stores the generated token in database 20 for future use.

After obtaining a token for the PAN from central database 20, tokenization server 18 returns the token to merchant 12 for use in settling the purchase transaction.

At a later time, the client settles the purchase transaction by submitting a settlement request to tokenization server 18. The settlement request includes the token and the final purchase transaction amount (i.e., a monetary value). In processing the settlement request, tokenization server 18 retrieves the PAN associated with the transaction based on the token from database 20 over network 16D. After the settlement request has been processed the client typically is informed of successful completion of the purchase transaction over network 16.

Conventional systems such as system 10 of FIG. 1 are dependent on communications network 16D between tokenization servers 18 and common database 20. In the event that a portion of a global communications network such as network 16D fails, processing of payment transactions in large portions of the world may be disrupted or halted due to lack of access to common database 20.

It may be desirable to distribute list 22 to regional databases for regional access that is not dependent on communications network 16. However, regional databases having local copies of list 22 may be problematic. For example, if multiple databases are maintained, a credit card number may become associated with more than one token. In another example, a single token may become associated with more than one credit card number resulting in confusion over who is responsible for payment related to a transaction.

These problems may be avoided by pre-populating a list on each and every regional database that contains a unique token for each and every possible credit card number. However, because sensitive numbers such as credit card numbers typically contain as many as, for example, 9, 12, or 16 digits, the required size of a list of all possible numbers is impractically large for storage and searching even for modern computing systems.

It may therefore be desirable to provide multiple distributed tokenization systems with a pre-populated fractional token table containing partial tokens and partial sensitive numbers along with equipment configured to generate a unique full token corresponding to any full sensitive number using the pre-populated fractional token table.

Figure 2:
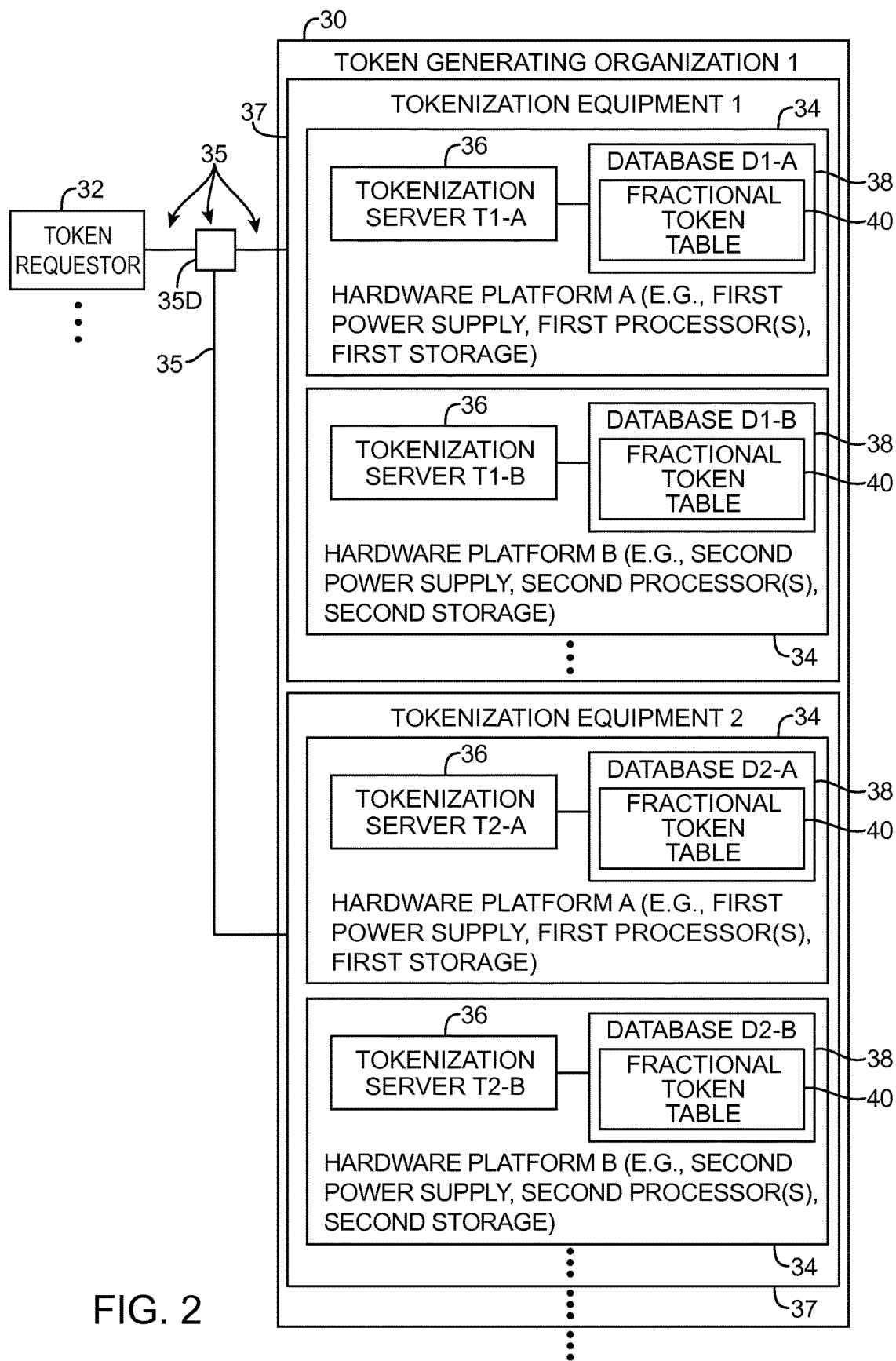
FIG. 2 is a system diagram showing illustrative equipment involved in generating tokens for online transactions in accordance with an embodiment of the present invention.

An illustrative token generating organization 30 having distributed tokenization systems at which tokens may be generated using pre-populated fractional token tables and provided to token requestors is shown in FIG. 2. As shown in FIG. 2, one or more token requestors 32 may communicate with tokenization equipment 37 of token generating organization 30 (e.g., a payment card processor, a hotel, a government agency, etc.) over communications network 35.

Token requesting entities such as token requestor 32 may be brick-and-mortar merchants (e.g., hotels, stores, etc.), may be online merchants, may be universities, government agencies, or other entities. Token generating organization 30 may be associated with one or more payment card companies, banks, credit card companies, government agencies, hotels, etc. For example, token generating organization 30 may be affiliated with a bank or a credit card company or may be a third party service that services payment requests for multiple credit card companies (as examples). As an example, token requestors 32 may be properties of a hotel chain that while token generating organization 30 may be a token generating organization owned and operation by the hotel chain.

Communications network 35 may include wired and wireless networks, local area networks, wide area networks such as the Internet, or other suitable communications paths. As shown in FIG. 2, communications network 35 may include a distributor such as distributor 35D that distributes token requests among the hardware resources of tokenization equipment 37 of token generating organization 30.

Tokenization equipment 37 may include geographically diverse equipment. For example, token generating organization 30 may have offices in multiple cities or other geographic locations. Each city (or other geographic location) may be associated with separate tokenization equipment. For example, equipment 1 may be located in a first city and equipment 2 may be located in a second city. Hardware redundancy may also be provided at each of these locations. For example, equipment 1 may have a first hardware platform 34 and a separate redundant hardware platform 34. The first and second hardware platforms (e.g., first and second tokenization systems implemented on first and second separate computers respectively) may be co-located. For example, the first and second computers may be located in a common building in the first city. Geographic redundancy may be provided using one or more hardware platforms at one or more additional geographic locations (see, e.g., tokenization equipment 2, etc.).

With this type of arrangement, there are multiple computers (hardware platforms) each of which forms a respective substantially similar redundant tokenization system for token generating organization 30. During operation, token requestors 32 may submit token requests to organization 30 over a communications network. Load balancing equipment such as distributor 35D may route incoming requests among systems 34 to ensure that no single one of systems 34 becomes overburdened with requests.

Token requests may include sensitive information such as a sensitive number (SN). Token requests including sensitive numbers may be sent from each token requestor 32 and may be routed by distributor 35D to an appropriate tokenization system 34 (e.g., in tokenization equipment 1 or tokenization equipment 2 or a particular system 34 at either of these locations) based on current loading at each tokenization system 34, based on geographical proximity of token requestor 32 to particular tokenization equipment 37, based on which of two or more redundant co-located systems 34 is in operation at a particular geographic location and has available capacity, based on the availability of portions of network 35 between token requestor 32 and a particular tokenization system 34 or based on other considerations.

For example, a token request from token requestor 32 may be routed to tokenization equipment 1. During routing of the token request to tokenization equipment 1, distributor 35D may receive information that tokenization equipment 1 is unavailable due to network disruptions in a portion of network 35 between distributor 35D and tokenization equipment 1. In response to receiving information that tokenization equipment 1 is unavailable, distributor 35D may route the token request to tokenization equipment 2. If desired, tokenization equipment such as tokenization equipment 1 may handle token requests from token requestors 32 in a given associated geographic region (e.g., a continent, a country, multiple countries, a state, multiple states, a city, multiple cities, parts of a city, or other geographic region). However, this is merely illustrative. Each tokenization system 34 may be configured to handle token requests from token requestors 32 in any geographic region. Other types of load partitioning may be used, if desired (e.g., to route requests based on request type, time of day, or other routing criteria).

Token generating organization 30 may include any number (e.g., one, two, three, more than three, four, more than four, etc.) of tokenization systems 34. As shown in FIG. 2, each block of co-located tokenization equipment 37 may include one or more physically distinct hardware platforms (systems 34) such as hardware platform A and hardware platform B of tokenization equipment 1 and hardware platform A and hardware platform B of tokenization equipment 2.

Each hardware platform may be implemented on physically distinct computing equipment including physically separate power supplies, processors, storage, etc. (i.e., separate computers or separate racks of computing equipment, etc.). Each hardware platform 34 may use its computing equipment to execute code associated with encryption and decryption processes, database management processes, authentication processes, settlement processes, token generation processes, sensitive information recovery processes, fraud detection processes, etc.

The use of multiple physically distinct hardware platforms (tokenization systems) at each geographic location such as hardware platforms A and B in equipment 1 may help ensure that organization 30 has the ability to generate tokens at a particular location (e.g., in the event that one hardware platform loses power or otherwise becomes inoperable). The use of hardware platforms (tokenization systems) at geographically diverse locations helps guard against regional service disruptions.

Each hardware platform 34 may include a tokenization server 36 and an associated database 38. Each database 38 may be provided with a common fractional tokenization table such as fractional token table 40. Each tokenization server 36 may be configured to generate a token corresponding to sensitive information in a token request by accessing fraction token table 40 on the associated database 38.

In the example of FIG. 2, token generating organization 30 includes at least two blocks of tokenization equipment 37 (e.g., tokenization equipment 1 and tokenization equipment 2) each having at least two tokenization systems (e.g., hardware platform A and hardware platform B).

In this example, hardware platform A of tokenization equipment 1 includes tokenization server T1-A coupled to associated database D1-A, hardware platform B of tokenization equipment 1 includes tokenization server T1-B coupled to associated database D1-B, hardware platform A of tokenization equipment 2 includes tokenization server T2-A coupled to associated database D2-A, and hardware platform B of tokenization equipment 2 includes tokenization server T2-B coupled to associated database D2-B. However, this is merely illustrative. Each block of tokenization equipment 37 may include any number of hardware platforms and each token generating organization 30 may include any number of regional blocks of tokenization equipment 37.

Fractional token table 40 of database D1-A of tokenization equipment 1 may be a common tokenization table that is identical to fractional token table 40 of databases D1-B, D2-A, D2-B, etc.

Any tokenization server 36 of a token generating organization 30 may be configured to generate a common full token that corresponds uniquely to any full sensitive number received in a token request using common fractional token table 40. For example, in response to a token request containing a particular sensitive number, tokenization servers T1-A and T2-B may generate a same token corresponding to that particular sensitive number. In this way, a single sensitive number such as a credit card number may correspond uniquely to one and only one token and a single token may correspond uniquely to one and only one sensitive number, regardless of which tokenization server generates the token.

Tokenization table 40 may be pre-populated with partial sensitive numbers such as partial social security numbers, partial license numbers, partial credit card numbers, etc. In one embodiment which is sometimes described herein as an example, sensitive information in a token request may include a primary account number (PAN) associated with a payment card. In this example, tokenization table 40 may include partial primary account numbers (PANs) (e.g., half-PANs, quarter-PANs, eighth-PANs or other fractional PANs) and uniquely corresponding partial tokens (e.g., half-tokens, quarter-tokens, eighth-tokens, or other respective fractional tokens).

A token requestor 32 may desire to obtain a token corresponding to sensitive information obtained at the token requestor. For example, when a customer desires to make a purchase at a merchant, the merchant obtains a PAN associated with a payment card account of the customer (e.g., the customer's credit card number). As an example, a magnetic card reader or other computing equipment at the merchant may be used to read the PAN from the customer's card.

A token requestor such as token requestor 32 may submit a token request that includes the sensitive information to token generating organization 30 over communications network 35. The token request may be routed by distributor 35D to appropriate tokenization equipment 37. In response to receiving a token request, the tokenization equipment 37 may generate and return a token that corresponds uniquely to the sensitive information in the token request to token requestor 32.

For example, the merchant may submit an authorization request to a token generating organization such as a payment processor to determine whether the customer is authorized to make a purchase. The authorization request generally includes the PAN and a requested authorization amount. The authorization amount may be somewhat larger than the actual expected purchase price. The payment card processor may determine whether the customer is authorized to make a purchase of the requested amount. If authorized, the payment processor may generate and return a token to the merchant that corresponds uniquely to the customer's PAN.

Each entry in fractional token table 40 may include a partial sensitive number and a unique partial token for that partial sensitive number. When presented with a sensitive number such as a social security number, a PAN, etc. associated with sensitive information in a token request, tokenization server 36 may generate a full token corresponding to the full sensitive number using the fractional token table 40 on the local database 38.

A sensitive number associated with sensitive information in a token request may, for example, contain 16 digits. Fractional token tables 40 stored on databases 38 of systems 34 may, for example, be half-token tables that contain a list of each and every possible 8 digit number (e.g., 0000 0000 through 9999 9999). A half-token table that includes a list of all possible 8 digit numbers may include a corresponding list of 8 digit tokens, each uniquely corresponding to one of the 8 digit numbers in the half-token table.

Tokenization servers 36 may be configured to use hardware platform computing equipment to generate full tokens corresponding uniquely to full sensitive numbers by running a predetermined number of rounds of a tokenization cycle. Each tokenization cycle may include tokenizing portions of a sensitive number (e.g., a PAN, a SSN, etc.) and modifying the tokenized portions of sensitive number. In the example of a half-token table, tokenization servers 36 may be configured to tokenize a first half of a sensitive number and to generate a full token corresponding to the full sensitive number in part by modifying the tokenized first half of the sensitive number using a non-tokenized second half of the sensitive number. The step of modifying the tokenized first half of the sensitive number may be implemented as part of a round of a Feistel network run on the tokenization server to generate the full token using the fractional token table.

After generating a full token for the sensitive number in the token request with tokenization server 36, tokenization system 34 may return the full token to token requestor 32.

At a later time, token requestor 32 may want to recover the sensitive number (e.g., to recover a PAN in order to settle the purchase transaction). The token requestor may submit a sensitive-information-recovery (SIR) request to token generating organization 30. The SIR request may include the full token and, if desired, additional information (e.g., a monetary value such as the final purchase transaction amount). In the example of a purchase transaction involving a token, a final purchase transaction amount may be equal to a previously authorized amount or may be different from a previously authorized amount. As an example, if an authorization was requested for $5000, the final purchase transaction amount may be for $1034.

A sensitive-information-recovery request may be routed by distributor 35D to any of tokenization equipment 37 of token generating organization 30. One of tokenization servers 36 at the tokenization equipment 37 that receives the settlement request may recover the full sensitive number (e.g., a full PAN, a full SSN, etc.) from the full token using the fractional token table 40 (e.g., a half-token table) stored on the corresponding local database 38. Tokenization server 36 may recover the full sensitive number from the full token using the fractional token table by running the tokenization cycle in reverse for the same predetermined number of rounds that were used to generate the full token.

FIG. 3 shows a portion of a fractional token table 40 that is implemented using a half-token table for tokenizing 16 digit sensitive numbers. As shown in FIG. 3, fractional token table 40 may contain a first column having half-sensitive-numbers (half-SNs) 44 and a second column having half-tokens 42. Each half-SN 44 may have a uniquely associated half-token. Half-SNs 44 may, for example, be half-primary-account-numbers (half-PANs) associated with a payment card.

In the example of FIG. 3, a half-SN 1234 1111 corresponds uniquely to a half-token 5390 0000 and a half-SN 1234 2222 corresponds uniquely to a half-token 4311 1234. A fractional token table such as half-token table 40 of FIG. 3 may include one entry for each and every possible 8 digit half-SN (e.g., $10^8$ entries). Providing a half-token table with each and every possible 8 digit half-SN may help ensure that each half-token is only associated with a single half-SN. In this way, generation of multiple tokens corresponding to a single SN and generation of a single token corresponding to multiple SNs may be avoided.

Before providing fractional token table 40 to databases 38, fractional token table 40 may be populated with partial tokens such as half-tokens 42 generated using a random number generator (e.g., a pseudo-random number generator, a truly random number generator, a hardware-generated random number generator, etc.). If desired, partial tokens such as half-tokens 42 may be shuffled with respect to half-SNs 44 (e.g., using a Knuth shuffle or other shuffling process).

In a typical token request, a full token corresponding to a full SN such as a full PAN may be desired. Full tokens may be generated by tokenization servers such as tokenization servers 36 of FIG. 2 using a fractional token table such as half-token table 40 of FIG. 3 by breaking apart a full SN into half-SNs, tokenizing each half-SN (e.g., by mapping each half-SN into a unique half-token) and suitably modifying and combining the tokenized half-SNs with each other and/or with the un-tokenized half-SNs to generate a full token.

Figure 4:
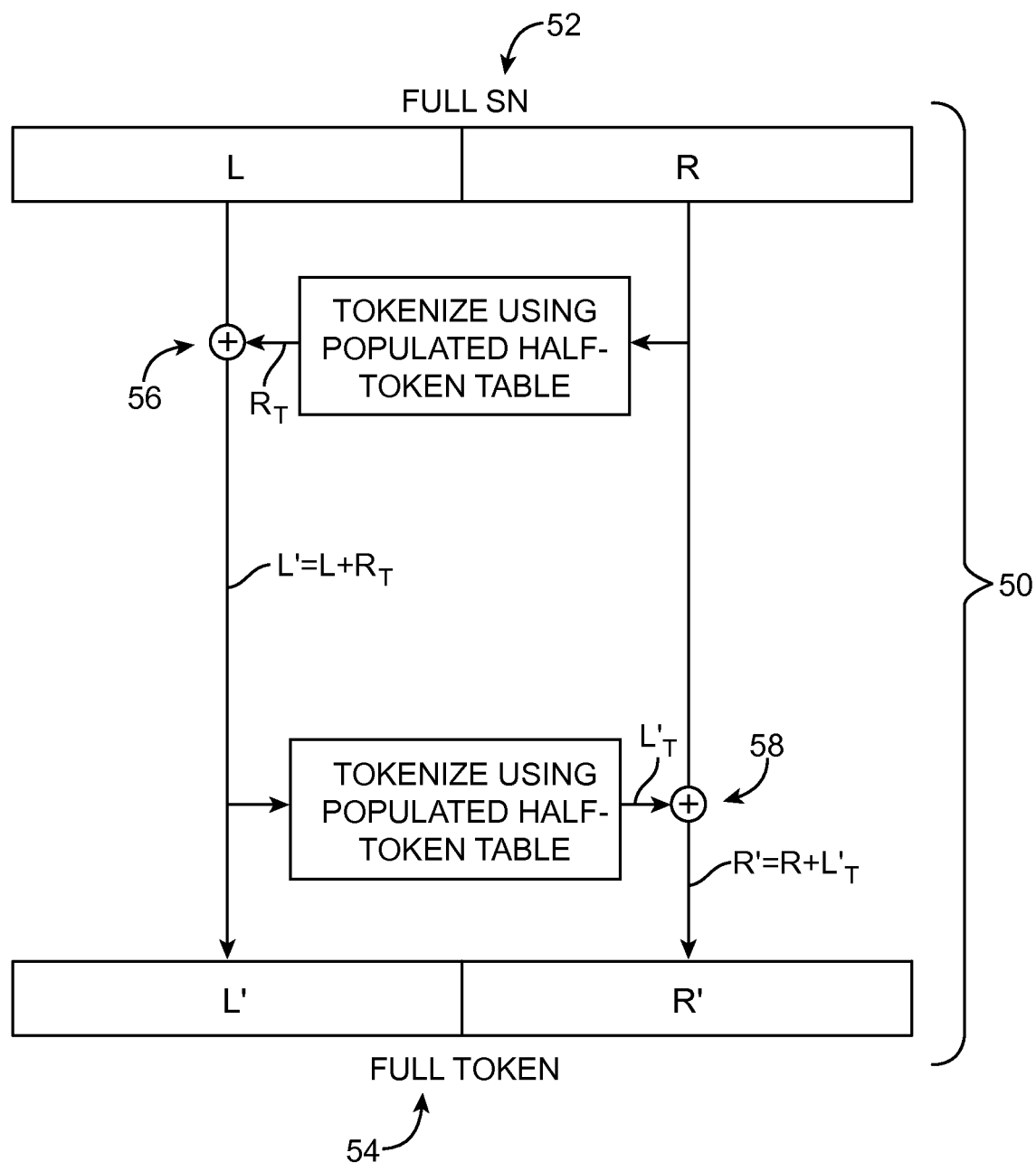
FIG. 4 is a diagram showing how a Feistel network may be used to generate a full token from a full sensitive number based on a pre-populated fractional token table in accordance with an embodiment of the present invention.

A diagram showing an example of a suitable method for tokenizing partial sensitive numbers such as half-SNs and modifying and combining tokenized partial sensitive numbers and un-tokenized partial sensitive numbers to generate full tokens is shown in FIG. 4. As shown in FIG. 4, a full token may be generated from a full sensitive number (SN) using a half-token table by running the SN through a Feistel network of the type that is sometimes used in encryption schemes for encryption of sensitive data.

A tokenization cycle such as tokenization cycle 50 may be run on a chosen one of tokenization servers 36 for a predetermined number of rounds. Tokenization cycle 50 may include running a full sensitive number such as full SN 52 through a Feistel network for the predetermined number of rounds by first separating full SN 52 into a first half such as left half L and a second half such as right half R. This is merely illustrative. If desired, any two portions of full SN 52 may be used in tokenization cycle 50.

In the example of FIG. 4, right half R of full SN 52 is tokenized (e.g., mapped to a uniquely corresponding half-token) using a fractional token table such as half-token table 40 of FIG. 3 to generate a tokenized right half $R_T$. Tokenized right half $R_T$ of full SN 52 may then be added to left half L of full SN 52 as indicated by junction 56, thereby generating a left half-token L'=L+$R_T$. Tokenized right half $R_T$ of full SN 52 may be added to left half L by executing a reversible addition function (e.g., an addition operation such as digit-wise addition, arithmetic addition with truncation to preserve length, an exclusive OR (XOR) operation, or other addition process that, when run in reverse by subtracting the tokenized right half $R_T$ of full SN 52 from result L' of the addition at junction 56, recovers left half L of full SN 52).

The resulting left half-token L' from the reversible addition at junction 56 (i.e., the addition of left half L and the tokenized right half $R_T$ of full SN 52) may then become left half-token L' of full token 54. The result L' may also be tokenized using half-token table 40 (e.g., L' may be treated as a half-SN and mapped to a uniquely corresponding half-token) to generate a tokenized half-token $L_T'$. The tokenized result $L_T'$ may then be added to right half R of full SN 52 as indicated by junction 58 to produce a right half-token R'=R+$L_T'$. As described above in connection with addition 56, tokenized half-token $L_T'$ may be added to right half R at junction 58 using a reversible addition process (e.g., an addition process such as digit-wise addition, arithmetic addition with truncation, an XOR process, or other addition process that, when run in reverse by subtracting the tokenized half-token $L_T'$ from right half-token R' recovers right half R of full SN 52).

Tokenization cycle 50 may be repeated for a predetermined number of rounds (e.g., one round, two rounds, three rounds, four rounds, more than four rounds, 10 rounds, more than ten rounds, 100 rounds, more than 100 rounds, etc.) by running the Feistel network of FIG. 4 repeatedly using the result (e.g., a previous full token 54) of the previous round to replace full SN 52 in the current round. The resulting half-tokens L' and R' of the final round may be combined to form full token 54 that is transmitted to a token requestor over a communications network in response to a token request (e.g., a token request associated with an authorization request for a purchase transaction).

Full token 54 may be formed by suitably combining the left half-token L' and right half-token R'. In the example of FIG. 4, right half-token R' is appended to left half-token L'. However, this is merely illustrative. If desired, right half-token R' may be pre-pended to left half-token L' or otherwise combined with left half-token L' to form a full token 54 having the same length as full SN 52.

Figure 5:
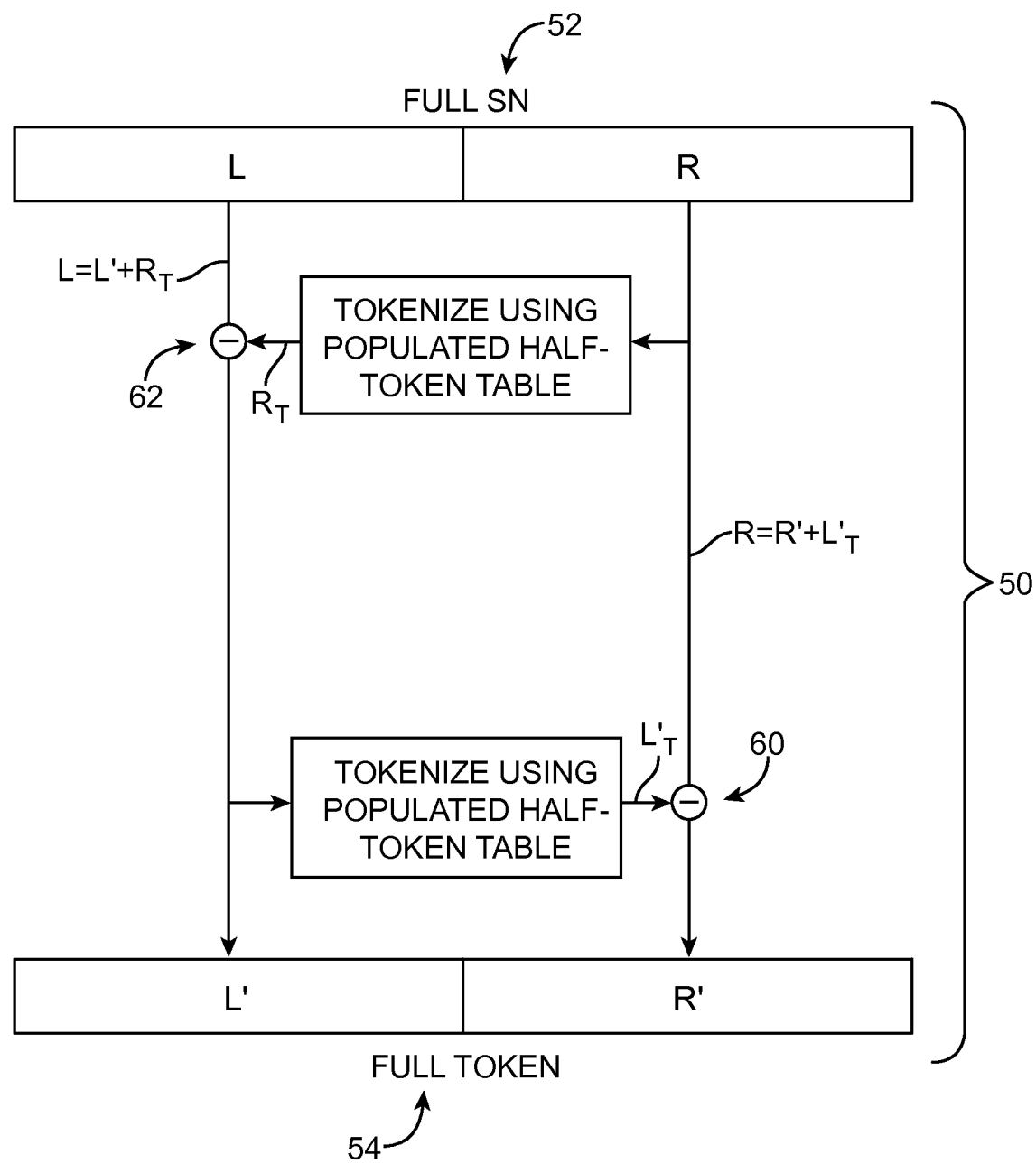
FIG. 5 is a diagram showing how a Feistel network of the type shown in FIG. 4 may be run in reverse to recover a full sensitive number from a full token based on a pre-populated fractional token table in accordance with an embodiment of the present invention.

A full sensitive number such as full SN 52 may be recovered from full token 54 by running the Feistel network of tokenization cycle 50 in reverse (for the same number of predetermined rounds that were used in generating full token 54), as shown in FIG. 5. In order to recover a full sensitive number (e.g., a social security number, a PAN, etc.), a token requestor may submit a sensitive-information-recovery (SIR) request to token generating organization 30. For example, a merchant may submit a SIR request such as a settlement request to a token generating organization such as a payment processor that includes the full token (and, if desired) the final monetary purchase transaction amount.

Tokenization servers 36 at tokenization equipment 37 may be configured to recover full SN 52 from full token 54 using a fractional token table such as half-token table (FIG. 3) by separating full token 54 (received from token requestor 32) into portions such as left half L' and right half R'. As shown in FIG. 5, left half L' of full token 54 may be tokenized (e.g., left half L' may be treated as a half-SN and mapped to a uniquely corresponding half-token) using a fractional token table such as half-token table 40. Tokenized left half $L_T'$ of full token 54 may then be subtracted from right half R' of full token 54 as indicated by junction 60. Tokenized left half $L_T'$ of full token 54 may be subtracted from right half R' using a subtraction process that reverses the addition performed at junction 58 of FIG. 4 (e.g., a subtraction process in which the result of the subtraction at junction 60 is right half R of full SN 52).

The result R of the subtraction at junction 60 (i.e., $R=R'-L_T'$) may then become the recovered right half R of full SN 52. The result R may also be tokenized using half-token table 40 to generate tokenized right half $R_T$. Tokenized right half $R_T$ may then be subtracted from left half-token L' of full token 54 as indicated by junction 62 to recover left half L of full SN 52. As described above in connection with subtraction 60, tokenized right half $R_T$ may be subtracted from left half-token L' at junction 62 using a subtraction process that reverses the addition performed at junction 56 (e.g., a subtraction process in which the result of the subtraction at junction 60 is left half L of full SN 52).

In configurations in which tokenization cycle 50 was run for a predetermined number M rounds to generate full token 54, full SN 52 may be recovered from full token 54 by running tokenization cycle 50 in reverse (as described in connection with FIG. 5) for the same number M of rounds. In each round of tokenization cycle 50 that is run in reverse, the result of the previous round may replace full token 54 and tokenization process 50 may be repeated in reverse.

Figure 8:
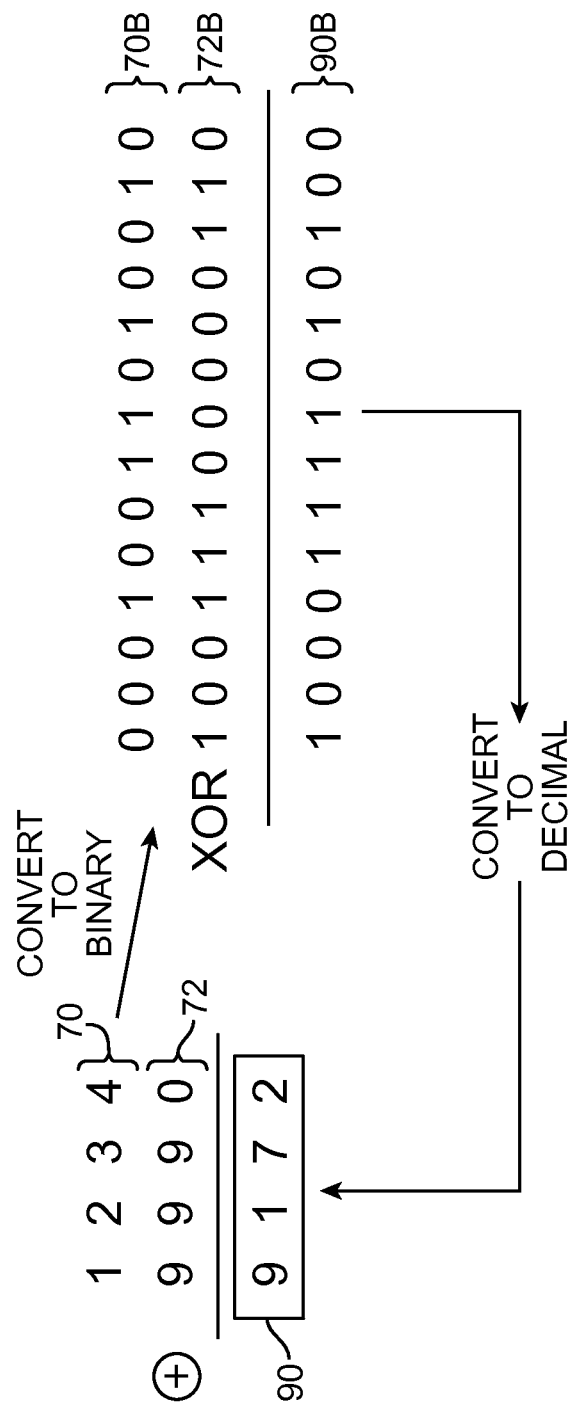
FIG. 8 is a diagram showing how values may be combined using an exclusive OR function in accordance with an embodiment of the present invention.

As described above in connection with FIG. 4, the additions that are performed at junctions 56 and 58 of tokenization cycle 50 may be reversible additions. Examples of reversible addition processes are shown in FIGS. 6, 7, and 8.

Figure 6:
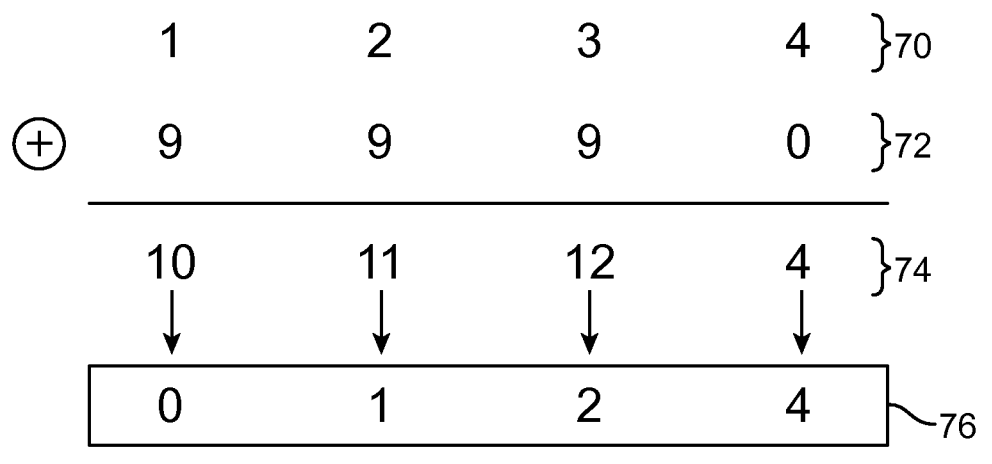

As shown in FIG. 6, a reversible addition process may include a digit-wise addition in which each digit of a first number such as number 70 is added, modulo 10, to a corresponding digit of a second number such as number 72 to generate a result 76 having the same number of digits at the first and second numbers. In the example of FIG. 6, first number 70 and second number 72 each have four digits. Each digit of number 70 is added to the corresponding digit of number 72.

The addition of each digit of numbers 70 and 72 results in a number (as indicated by array of numbers 74) that may be equal to, larger or smaller than 9. Numbers smaller than or equal to nine may form a digit of result 76. The first digit of numbers larger than nine may be dropped so that only the trailing digit is used to form a digit of result 76. The digit-wise addition process illustrated by FIG. 6 may be used, for example, to add a portion of a sensitive number such as half-SN R to a tokenized half-token such as tokenized half-token $L_T'$ by substituting number 70 with half-SN R and replacing number 72 with tokenized half-token $L_T'$. The digit-wise addition process illustrated by FIG. 6 may be used, for example, to add a portion of a sensitive number such as half-SN L to a tokenized portion of a SN such as tokenized half-SN $R_T$ by replacing number 70 with half-SN L and replacing number 72 with tokenized half-SN $R_T$.

Figure 7:
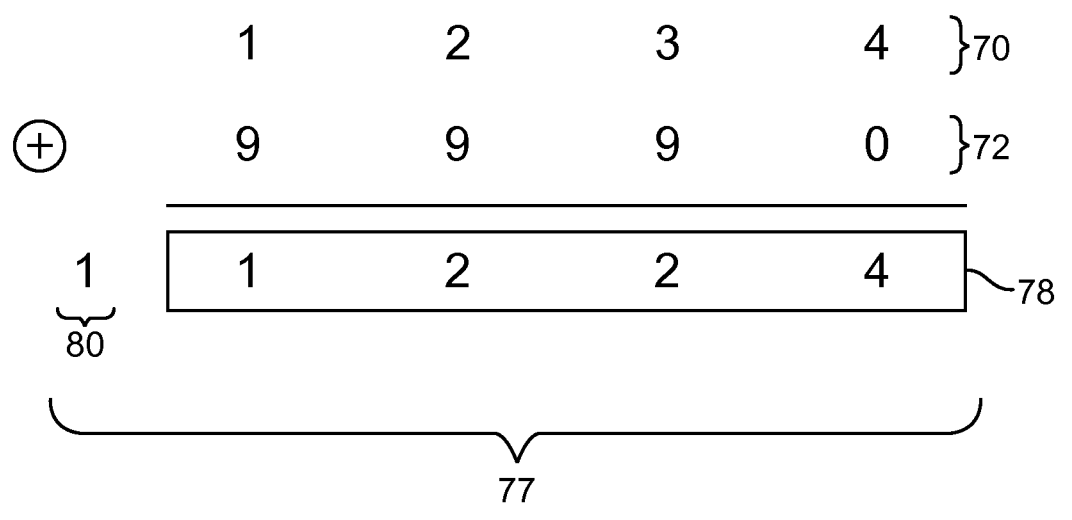

If desired, a reversible addition process at junctions 56 and 58 may include a length-preserving arithmetic addition as shown in FIG. 7. In the example of FIG. 7, numbers 70 and 72 are added arithmetically to produce a result 77 having more digits than numbers 70 and 72. Result 78 is derived from result 77 by dropping any leading digits such as digit 80 beyond the number of digits in numbers 70 and 72.

In the example of FIG. 7, one digit 80 is dropped effectively producing an addition modulo 10,000. However, this is merely illustrative. A reversible addition process at junctions 56 and 58 may add numbers having more than four digits (e.g., 8 digits). In a length-preserving arithmetic addition involving numbers with more than four digits, zero, one or more digits may be dropped to form a result having a same number of digits in common with the numbers being added. The length-preserving arithmetic addition process illustrated by FIG. 7 may be used, for example, to add a portion of a sensitive number such as half-SN R to a tokenized half-token such as tokenized half-token $L_T'$ by replacing number 70 with half-SN R and replacing number 72 with tokenized half-token $L_T'$. The length-preserving arithmetic addition process illustrated by FIG. 7 may be used, for example, to add a portion of a SN such as half-SN L to a tokenized portion of a SN such as tokenized half-SN $R_T$ by replacing number 70 with half-SN L and replacing number 72 with tokenized half-SN $R_T$.

If desired, a reversible addition process at junctions 56 and 58 may include an exclusive OR (XOR) operation as shown in FIG. 8. As shown in FIG. 8, a reversible addition involving an XOR operation may include converting numbers such as numbers 70 and 72 into binary representations 70B and 72B respectively. Binary number 70B may then be added to binary number 72B using an XOR operation in which each digit of the binary number 70B is added to the corresponding digit of binary number 72B modulo 2.

Binary result 90B of the XOR operation may then be converted into a decimal representation to generate result 90. The XOR addition process illustrated by FIG. 8 may be used, for example, to add a portion of a sensitive number such as half-SN L to a tokenized portion of a SN such as tokenized half-SN $R_T$ by replacing number 70 with half-SN L and replacing number 72 with tokenized half-SN $R_T$. The XOR addition process illustrated by FIG. 8 may be used, for example, to add a portion of a sensitive number such as half-SN R to a tokenized half-token such as tokenized half-token $L_T'$ by replacing number 70 with half-SN R and replacing number 72 with tokenized half-token $L_T'$.

Figure 9:
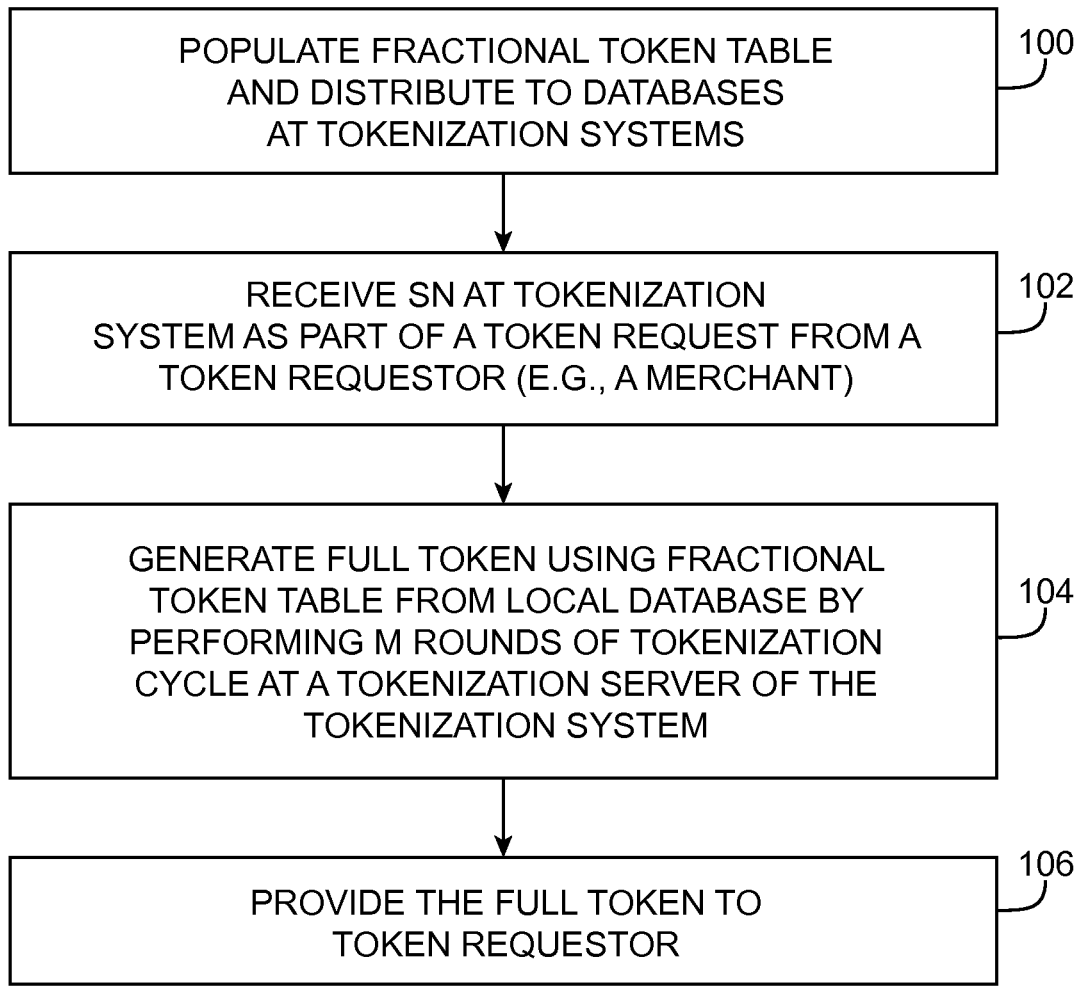
FIG. 9 is a flow chart of illustrative steps involved in handling token requests in accordance with an embodiment of the present invention.

Illustrative steps involved protecting sensitive data in online transactions by generating tokens for token requestors using tokenization servers implemented on tokenization equipment of a token generating organization are shown in FIG. 9.

At step 100, a fractional token table such as half-token table 40 of FIGS. 2 and 3 may be populated with fractional tokens and fractional sensitive numbers such as half-tokens and half-SNs respectively. The pre-populated fractional token table may be distributed to local databases such as databases 38 of tokenization systems 34.

At step 102, a token request that includes a full SN may be received by tokenization equipment of token generating organization 30 over a communications network such as communications network 35 from a token requestor. A token request may, for example be included in an authorization request associated with a purchase transaction at a merchant.

At step 104, a full token that uniquely corresponds to the full SN in the token request may be generated using a tokenization server such as a selected one of tokenization servers 36 of tokenization equipment 37 that received the token request. The full token may be generated from the full SN by performing a predetermined number M rounds of a tokenization cycle. Each round of the tokenization cycle may include a round of a Feistel network that uses a fractional token table stored on the local database of the tokenization system. A full token may be generated by combining (e.g., appending) two or more fractional tokens (e.g., half-tokens). A fractional token may be generated in part by tokenizing a portion of the SN and modifying the tokenized portion of the SN with at least one reversible addition.

At step 106, the full token may be provided to the token requestor from the tokenization equipment.

The steps shown in FIG. 9 may be used, for example, to authorize a purchase transaction between a customer and a merchant in a payment system having merchant computing equipment associated with the merchant and payment card processor computing equipment associated with the payment card processor (payment processor), to obtain a token corresponding to a primary account number of a payment card.

Figure 10:
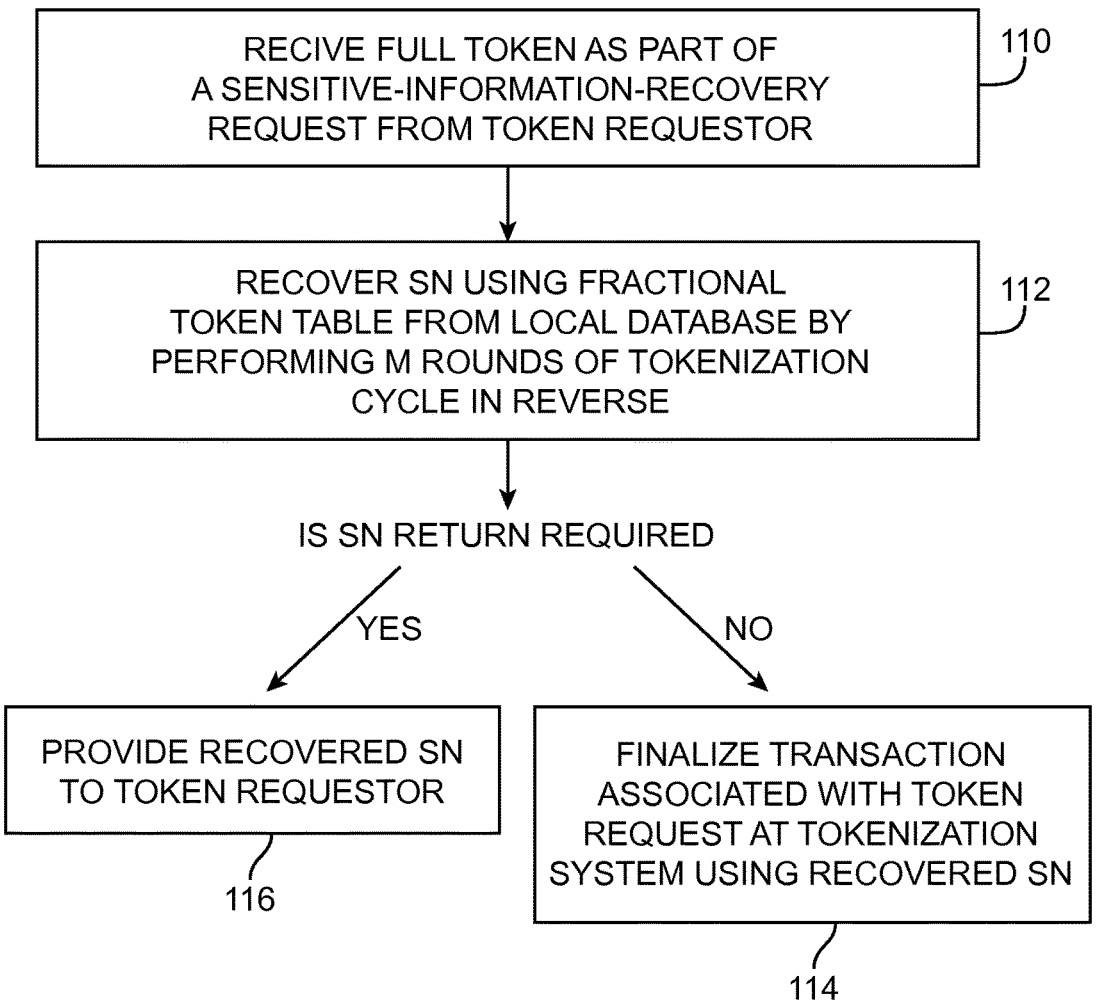
FIG. 10 is a flow chart of illustrative steps involved in handling sensitive-information-recovery requests in accordance with an embodiment of the present invention.

Illustrative steps involved in recovering a sensitive number corresponding to a token received by tokenization equipment in a sensitive-information-recovery request from a token requestor are shown in FIG. 10.

At step 110, a sensitive-information-recovery request that includes the full token that was provided by a tokenization generating organization to the token requestor may be received from the token requestor at any of tokenization equipment 37. The SIR request may be received at the same tokenization system that generated the token or may be received at a different tokenization system.

At step 112, the full SN may be recovered from the full token by performing the predetermined number M rounds of the tokenization cycle in reverse. Each round of a tokenization cycle performed in reverse may include a round of a Feistel network run in reverse that uses the fractional token table stored on the local database of the regional payment processor. The full SN may be recovered by combining (e.g., appending) two or more fractional SNs (e.g., half-SNs). A fractional SN may be recovered in part by tokenizing a portion of the full token and modifying the tokenized portion of the full token with at least one subtraction operation that reverses a reversible addition operation performed in generating the full token from the full SN.

Some SIR requests such as SIR requests involving social security numbers or other identifying numbers may require that the sensitive information (e.g., the sensitive number) be returned to the token requestor. Other SIR requests such as settlement requests associated with purchase transactions involving payment cards may be processed (e.g., settled) at the tokenization equipment without returning the sensitive information to the token requestor.

If the SIR request does not require the sensitive information (e.g., the sensitive number) to be returned to the token requestor, a tokenization system may proceed to step 114. At step 114, the tokenization system computing equipment may be used to finalize the transaction using the full SN recovered from the full token at the tokenization system.

If the SIR request requires the sensitive information (e.g., the sensitive number) to be returned to the token requestor, a tokenization system may proceed to step 116. At step 116, the tokenization system computing equipment may be used to provide the full SN recovered from the full token at the tokenization system to the token requestor.

The foregoing is merely illustrative of the principles of this invention and various modifications can be made by those skilled in the art without departing from the scope and spirit of the invention.

What is claimed is:

1. A method for protecting sensitive information in online transactions using geographically distributed tokenization systems, wherein each geographically distributed tokenization system includes a tokenization server and a local database, and wherein each of the local databases stores a fractional token table, the method comprising:
    generating, by a random number generator, a plurality of fractional token tables, each of the fractional token tables comprising a plurality of different string portions and corresponding different partial-tokens;
    storing the plurality of fractional token tables at multiple geographically distributed tokenization systems;
    with the geographically distributed tokenization systems, receiving token requests from token requestors, wherein each of the token requests includes a string of sensitive information, the string of sensitive information comprising plural string portions;
    with the geographically distributed tokenization servers, generating full tokens corresponding to the sensitive information in the token requests, wherein generating each full token comprises a tokenization system of the geographically distributed tokenization servers running the string portions of a string of sensitive information from a selected token request through a plurality of rounds of a Feistel network using the plurality of fractional token tables stored at that tokenization system, wherein each of the plurality of fractional token tables maps partial tokens to string portions in the string of sensitive information from the selected token request, and wherein the generated full tokens protect the sensitive information received in the online transactions;
    providing the full tokens to the token requestors;
    with a receiving tokenization system of the geographically distributed tokenization servers, receiving a full token in a sensitive-information-recovery request from a token requestor;
    with the receiving tokenization system of the geographically distributed tokenization servers, recovering the string of sensitive information corresponding to the received full token, wherein the recovering comprises recovering each string portion in the string of sensitive information corresponding to the received full token by running partial tokens in the received full token through the plurality of rounds of the Feistel network using the plurality of fractional token tables stored at that tokenization system; and
    providing the recovered string of sensitive information to the token requestor.

2. The method defined in claim 1, wherein the random number generator comprises at least one of a pseudorandom number generator, a truly random number generator, and a hardware-generated random number generator and wherein the running the string portions of a string of sensitive information from a selected token request through a plurality of rounds of a Feistel network comprises:
    mapping, by a first fractional token table, a first string portion to a first partial token;
    combining the first partial token with a second string portion to provide a first tokenized result;
    mapping, by a second fractional token table, the first tokenized result to a second partial token; and
    combining the second partial token with the first string portion to provide a second tokenized result.

3. The method defined in claim 1, wherein the random number generator comprises at least one of a pseudorandom number generator, a truly random number generator, a hardware-generated random number generator and wherein the running the string portions of a string of sensitive information from a selected token request through a plurality of rounds of a Feistel network comprises:
    modifying a tokenized first string portion of the string of sensitive information using a non-tokenized second string portion of the string of sensitive information.

4. The method defined in claim 3, wherein recovering the string of sensitive information comprises running full tokens through the plurality of rounds of the Feistel network in reverse.

5. The method defined in claim 1, wherein the partial tokens are half tokens, and wherein the string portions are half portions of strings of sensitive information.

6. The method defined in claim 4, wherein running sensitive information through the plurality of rounds of the Feistel network comprises performing at least one reversible addition operation, and wherein running full tokens through the plurality of rounds of the Feistel network in reverse comprises performing at least one subtraction operation to reverse the at least one reversible addition operation.

7. The method defined in claim 1, wherein each round of the plurality of rounds is performed using a portion of the string of sensitive information included in a corresponding token request and wherein the random number generator generates the plurality of fractional token tables by randomly shuffling an array of string portions.

8. In a geographically distributed network of tokenization systems, a tokenization system for online transactions comprising a server implemented in hardware, the server to:
  generate, by a random number generator, a plurality of fractional token tables, each of the fractional token tables comprising a plurality of different string portions and corresponding different partial-tokens;
  storing the plurality of fractional token tables;
  receive, from a token requestor as part of an online transaction, a token request including a string of sensitive information, the string of sensitive information comprising plural string portions;
  in response to the token request, process the plural string portions through a plurality of rounds of a Feistel network using a fractional token table of the plurality of fractional token tables, wherein the fractional token table maps partial tokens to string portions;
  generate a first full token based on the plurality of rounds of the Feistel network;
  provide the first full token to the token requestor to use in the online transaction;
  receive, as part of the online transaction, the first full token in a sensitive-information-recovery request;
  recover the string of sensitive information corresponding to the received first full token, wherein the recovering comprises recovering each string portion in the string of sensitive information corresponding to the received first full token by running partial tokens in the received first full token through the plurality of rounds of the Feistel network using the plurality of fractional token tables; and
  provide the recovered string of sensitive information as part of the online transaction.

9. The tokenization system defined in claim 8, wherein the random number generator comprises at least one of a pseudorandom number generator, a truly random number generator, and a hardware-generated random number generator and wherein the running the string portions of a string of sensitive information from a selected token request through a plurality of rounds of a Feistel network comprises and the server to:
  map, by a first fractional token table, a first string portion to a first partial token;
  combine the first partial token with a second string portion to provide a first tokenized result;
  map, by a second fractional token table, the first tokenized result to a second partial token; and
  combine the second partial token with the first string portion to provide a second tokenized result.

10. The tokenization system defined in claim 8, wherein the random number generator comprises at least one of a pseudorandom number generator, a truly random number generator, a hardware-generated random number generator and wherein the server to:
  modifying a tokenized first string portion of the string of sensitive information using a non-tokenized second string portion of the string of sensitive information.

11. The tokenization system defined in claim 10, the server to:
  process the first full token through the plurality of rounds of the Feistel network in reverse to recover the string of sensitive information.

12. The tokenization system defined in claim 11, the server to process the string of sensitive information through the plurality of rounds of the Feistel network using at least one reversible addition operation, and the server to process the string of sensitive information through the plurality of rounds in reverse using at least one subtraction operation to reverse at least one reversible addition operation.

13. The tokenization system defined in claim 8, wherein the partial tokens are half tokens, and wherein the string portions are half portions of the string of sensitive information.

14. The tokenization system defined in claim 8, wherein each round of the plurality of rounds is performed using a portion of the string of sensitive information included in the token request.

15. In a geographically distributed network of tokenization systems, a tokenization system for online transactions comprising a server implemented in hardware, the server to:
  generate, by a random number generator, a plurality of fractional token tables, each of the fractional token tables comprising a plurality of different string portions and corresponding different partial-tokens;
  storing the plurality of fractional token tables;
  receive, from a token requestor as part of an online transaction, a token request including a string of sensitive information, the string of sensitive information comprising plural string portions;
  in response to the token request:
    map, by a first fractional token table, a first string portion to a first partial token;
    combine the first partial token with a second string portion to provide a first tokenized result;
    map, by a second fractional token table, the first tokenized result to a second partial token; and
    combine the second partial token with the first string portion to provide a second tokenized result; and
    process the second tokenized result to provide a first full token; and
  provide the first full token to the token requestor as part of the online transaction.

16. The tokenization system defined in claim 15, further comprising:
  receive the first full token in a sensitive-information-recovery request as part of the online transaction;
  recover the string of sensitive information corresponding to the received first full token by performing the map and combine operations in reverse; and
  provide the recovered string of sensitive information as part of the online transaction.

17. The tokenization system defined in claim 16, wherein the random number generator comprises at least one of a pseudorandom number generator, a truly random number generator, and a hardware-generated random number generator and wherein the random number generator generates the plurality of fractional token tables by randomly shuffling an array of string portions.

18. The tokenization system defined in claim 17, wherein the partial tokens are half tokens, and wherein the string portions are half portions of strings of sensitive information.

* * * * *